United States Patent
Griffioen et al.

(10) Patent No.: US 6,572,081 B2
(45) Date of Patent: Jun. 3, 2003

(54) INSTALLATION OF GUIDE TUBES IN A PROTECTIVE DUCT

(75) Inventors: Willem Griffioen, Ter Aar (NL); Arie Van Wingerden, Hendrik Ido Ambacht (NL); Cornelis Van 'T Hul, Den Hoorn (NL); Pieter Lock, 's-Gravenhage (NL); Willem Greven, Delfzijl (NL); Frans Robbert Bakker, Wagenborgen (NL)

(73) Assignee: NKF Kabel B.V., Delft (NL)

( * ) Notice: Subject to any disclaimer, the term of this patent is extended or adjusted under 35 U.S.C. 154(b) by 0 days.

(21) Appl. No.: 09/751,157

(22) Filed: Dec. 27, 2000

(65) Prior Publication Data

US 2002/0081083 A1 Jun. 27, 2002

(51) Int. Cl.⁷ ................................................. H02G 1/08
(52) U.S. Cl. .................... 254/134.4; 29/468; 29/464; 226/97.1
(58) Field of Search ................ 29/468, 464; 226/97.1; 254/134.4

(56) References Cited

U.S. PATENT DOCUMENTS

| | | | |
|---|---|---|---|
| 4,408,828 A | * 10/1983 | Le Noane | 350/96.23 |
| 4,691,896 A | 9/1987 | Reeve et al. | |
| 4,850,569 A | 7/1989 | Griffioen et al. | |
| 4,934,662 A | 6/1990 | Griffioen et al. | |
| 5,197,715 A | 3/1993 | Griffioen | |
| 5,211,377 A | 5/1993 | Griffioen et al. | |
| 5,234,198 A | * 8/1993 | Hale | 254/134.4 |
| 5,308,041 A | 5/1994 | Griffioen et al. | |
| 5,474,277 A | 12/1995 | Griffioen | |
| 5,639,183 A | 6/1997 | Griffioen et al. | |
| 5,645,267 A | 7/1997 | Reeve et al. | |
| 5,884,384 A | * 3/1999 | Griffioen | 29/468 |
| 5,897,103 A | 4/1999 | Griffioen et al. | |
| 6,074,954 A | 4/2000 | Griffioen | |
| 6,129,341 A | 10/2000 | Griffioen | |
| 6,179,269 B1 | * 1/2001 | Kobylinski | 254/134.3 |
| 6,370,753 B1 | * 4/2002 | Washburn | 29/407.01 |

OTHER PUBLICATIONS

Griffioen, Nijstad, Grooten, Van Wingerden, Brown, Hawkins, Plumettaz, "A Cooper–in–Tube Access Network, Easy to Migrate to Optical Fibre", *Communications Cabling*, 1997, pp 20–24.

(List continued on next page.)

*Primary Examiner*—Joseph J. Hail, III
*Assistant Examiner*—Daniel Shanley

(57) ABSTRACT

Guide tubes are arranged in a loose bundle and are fed into an existing tubular conduit or protective duct by a powered tractor and are pulled through the duct by the volumetric flow of compressed air which is introduced into the inlet end of the duct. The guide tubes are pressurized and closed at their leading end and trailing end. The existing duct is open at both ends. When the filling degree of the guide tube bundle (sum of guide tube cross-sectional areas compared to that of channelization duct) is provided in the range of from about 30% to about 60%, blowing/pushing installation of the guide tube bundle is substantially trouble free, and the bundle of guide tubes can be installed in a flexible and efficient manner over relatively greater distances.

34 Claims, 6 Drawing Sheets

OTHER PUBLICATIONS

Griffioen, Nijstad, Grooten, Van Wingerden, Brown, Hawkins, Plumettaz, "A New, Extremely Versatile, Access Network Cabling Concept for Migration to Optical Fiber", *International Wire & Cable Symposium Proceedings*, 1996, pp 485–489.

Griffioen, Van Wingerden, Van 'T Hul, "Versatile Optical Access Network for Business and Future Consumer Market", *EC*, Jun. 1999.

Brown, Griffioen, Grooten, Hawkins, Nijstad, Plumettaz, Van Wingerden, "JETNET®, versatile access network solutions", *Technical Reports*, Apr. 1998, vol. XXVI n. 2, pp 233–240.

Griffioen, Van Wingerden, Van 'T Hul, Lock, Van Der Tuuk, "Innovative Solutions for Access Networks", *IWCS*, Nov. 2000, pp 1–5.

Griffioen, Van Wingerden, Van 'T Hul, "Versatile Outside Plant Solution for Optical Access Networks", *IWCS*, Nov. 1999, 5 pages (not numbered).

Griffioen, *Installation of Optical Cables in Ducts*, Plumettaz SA, 1993, book, 147 pages.

* cited by examiner

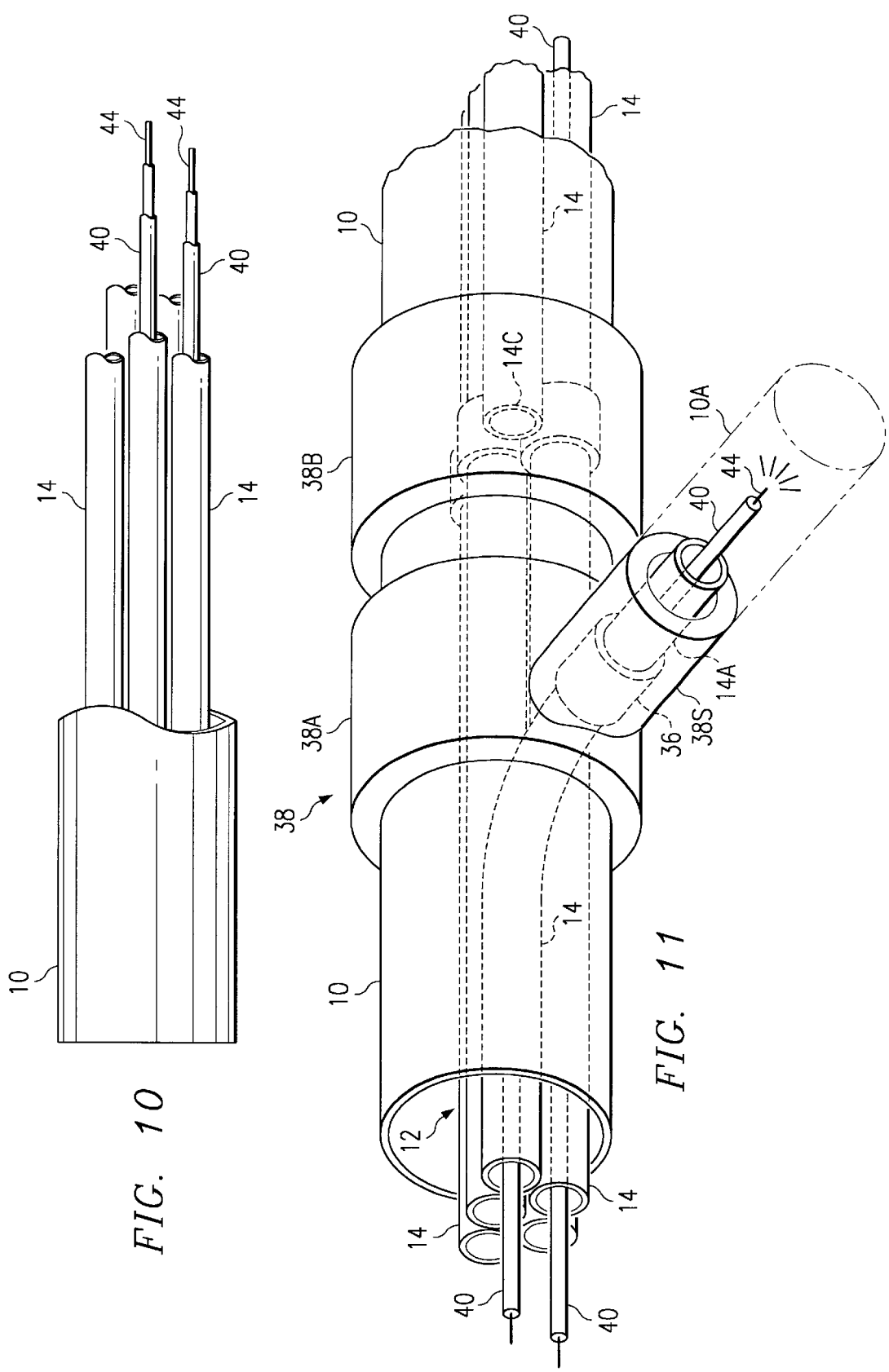

INSTALLATION OF GUIDE TUBES IN A PROTECTIVE DUCT

BACKGROUND OF THE INVENTION

This invention relates generally to optical telecommunications networks, and in particular to methods and apparatus for installing a loose bundle of guide tubes, through which fiber optic communications cables are to be routed, within a protective conduit such as an underground duct.

Various factors must be considered when fiber optic cable is installed in a conduit. A major concern is avoidance of damage to the cable during installation. Damage can occur in a variety of ways, namely 1) radial crushing the cable with installation equipment; 2) severe bending, twisting, flexing or stretching damage due to excessive forces applied during installation; 3) damaging the protective cable jacket, such as by abrasion, cracking or cutting the outer protective layer; and 4) long term exposure of the cable to environmental factors which cause thermal cycling.

Another concern is ease of installation and the desire for a reduction in the amount of time needed to install the cable. Also, there is a concern to avoid splices in the cable as much as possible. Splices are time consuming to make and may lead to a decrease in cable performance. Generally, it is desirable to install the longest continuous length of cable possible to reduce the number of splices needed for the desired cable run.

Protective cable ducts have been channelized in an effort to satisfy these concerns. For this purpose a tube, whose interior may have a lower coefficient of friction than the existing duct, is installed in the existing protective duct, thereby establishing a separate channel in which cable, optionally at a later time, can be blown or pulled through the protective duct over a greater length. It may also be desirable to install in an existing duct a larger number of tubes with a smaller cross section than that of the existing duct if it is desired to use each of the smaller tubes as a separate channel or subduct for single- or multi-core copper or glass fiber cables. Further, it may be necessary to install in an existing duct a protective tube with a water barrier, so that in the existing duct, whose interior gradually fills up with water through diffusion, a waterproof conduit is created by means of the second tube, this waterproof conduit allowing the routing of cables without a water shield.

An early approach to duct channelization is described in the article "Subducts: The answer to Honolulu's growing pains" by Herman S. L. Hu and Ronald T. Miyahira in Telephony, Apr. 7, 1980, pages 23–35. That arrangement accommodates fiber optic cables in a separate tube or subduct, with four guide channels being formed by partitioning a primary duct forming part of a primary duct network. As more telecommunications connections are needed, a fiber optic cable is pulled by a rope or winching wire through one of the channels, without the new fiber optic cable being hampered during installation by cables already present. At branches, a joint or splice is made in the fiber optic cable. EP-A-0,108,590 to Reeve describes a ducting network, the ducts of which have previously been provided with a number of separate channels, allowing a separate lightweight and flexible fiber optic member to be blown in by compressed air in each channel without armor or water barrier. The duct provided with channels protects the fiber optic members against external influences, such as moisture and the like. In this way, a network with individual fiber optic members to each customer is created, with the fiber optic members being arranged in parallel channels up to the branches.

U.S. Pat. Nos. 4,850,569 and 4,934,662 to Griffioen et al. describe combining high speed air flow with a pushing force applied at the entry end of the conduit to install a traditional (i.e. with non-negligible stiffness) cable. U.S. Pat. Nos. 5,197,715 and 5,474,277 to Griffioen further describe the use of a guide shuttle attached to the lead end of the cable which adds a tension force on the lead end of the cable, in addition to the motive forces applied to the cable via the high speed moving air.

These techniques also have been used advantageously for installing channelization guide tubes in an existing protective duct. For example, in U.S. Pat. No. 5,884,384 to Griffioen, channelization is achieved by installing a bundle of guide tubes or subducts in an existing protective duct by means a fluid under pressure, for instance compressed air, together with a pushing force exerted on the guide tubes as they enter the protective duct.

In the air blowing/pushing technique the air drag propelling forces on the bundle are distributed over the entire length of the guide tubes, and the longitudinal forces imposed on the guide tubes are kept low. For making the most productive use of available underground duct space, it has been the conventional practice during the initial installation to fill the protective duct as completely as possible with channelization guide tubes of various diameters to accommodate present and anticipated cable branching/drop requirements. In previous guide tube installations, the size and number of guide tubes have been selected to provide close to 100 percent filling of the protective duct. However, it was found in practice that such jobs incur increased installation time, along with a reduction of the overall bundle length that can be blown in continuously, thus requiring more guide tube joints, more duct junctions and, last but not least, a shorter maximal distance between handholes or manholes (if installation is done in an existing duct trajectory, where digging the street again is to be avoided).

During blowing/pushing installation of a bundle of guide tubes, the propelling air-drag force developed by the volumetric flow of air through the duct is proportional to the compressor output pressure and bundle diameter. However, the frictional load imposed by rubbing engagement is proportional to the bundle weight, hence to the square of the bundle diameter. Moreover, a bundle that fills the duct for a large part, when the bundle is tight, is subjected to extra friction caused by bends and undulations in the duct due to the stiffness of the bundle, which increases with the fourth power of the bundle diameter. On the other hand a bundle that just fits in the protective duct can be pushed harder without buckling, but the frictional loading caused by rubbing engagement of the guide tubes against the protective duct imposes a limit on the continuous installation length that can be obtained by pushing/blowing for such large bundle diameters.

SUMMARY OF THE INVENTION

It has been demonstrated during field trials that when the filling degree of the guide tube bundle (sum of guide tube cross-sectional areas compared to that of protective duct) is provided in the range of from about 30% to about 60%, blowing/pushing installation of the guide tube bundle is substantially trouble free. Also, unexpectedly, substantially longer continuous runs were accomplished in less time than required for relatively large diameter guide tube bundles. The selection of the diameter and number of guide tubes to provide a partial filling factor of not more than about 50%, with the guide tubes arranged in a loose bundle, provided the best results. The partial filling of guide tubes arranged in a loose bundle also provides good mechanical protection. By limiting the bundle diameter so that the guide tubes only partially fill the duct air flow space, preferably by a filling factor of about 50% (half of duct cross-sectional area) and not more than about 60%, the guide tubes and hence any cables contained therein are protected just as good as armored cables, because the loose guide tubes can move away when the duct is indented. Also, by installing the guide tubes as a loose bundle as opposed to a solid bundle, the guide tubes are more easily accessible at branch points which are formed as new subscribers are added. Further, a loose bundle of guide tubes has a reduced stiffness factor as compared with the same guide tubes arranged in a tightly bound bundle.

The invention is based on the insight that the propelling drag force needed to move a loose bundle of guide tubes (with or without cables) through a duct by the volumetric flow of compressed air is generally proportional to the effective external surface area presented by the guide tubes, which is in turn proportional to the effective diameter of the guide tube bundle. At the same time, the volumetric flow rate of compressed air through the protective duct is limited by the output pressure of the air compressor, which is generally constant, by the diameter of the duct (which is fixed) and by the flow resistance imposed by the mass of the guide tube bundle. The guide tube bundle throttles air flow through the surrounding bundle/duct annulus as the bundle diameter increases relative to the duct diameter.

BRIEF DESCRIPTION OF THE DRAWING

The invention will be further explained hereinafter on the basis of an exemplary embodiment with reference to the drawing figures, in which:

FIG. 10 is a perspective view of the protective duct shown in FIG. 1, partially in section, showing the disposition of the loose guide tubes and fiber optic cables within a protective duct;

FIG. 11 is a simplified perspective view of a section of protective duct which has been channelized with guide tubes installed according to the present invention, with a branch connector installed for routing a drop cable to a customer;

DETAILED DESCRIPTION OF THE PREFERRED EMBODIMENTS

The invention will now be described on the basis of examples where guide tubes are installed in protective conduits which are intended to function as dedicated cable ducts. Unless otherwise specified, all dimensional measurements are given in metric units.

Figure 1:
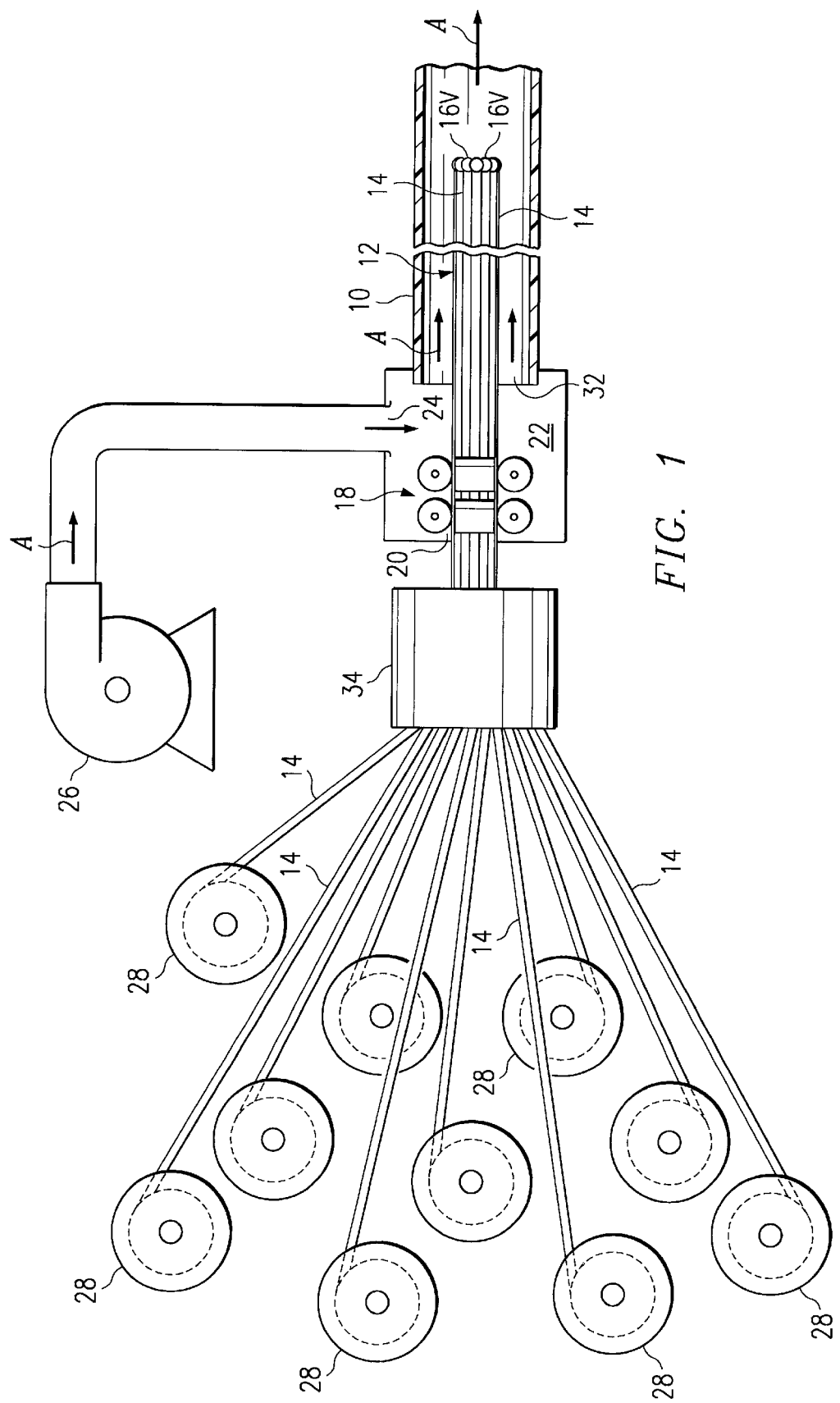
FIG. 1 is a schematic side elevation view showing installation of a loose bundle of guide tubes according to the method of the present invention.
Figure 1A:
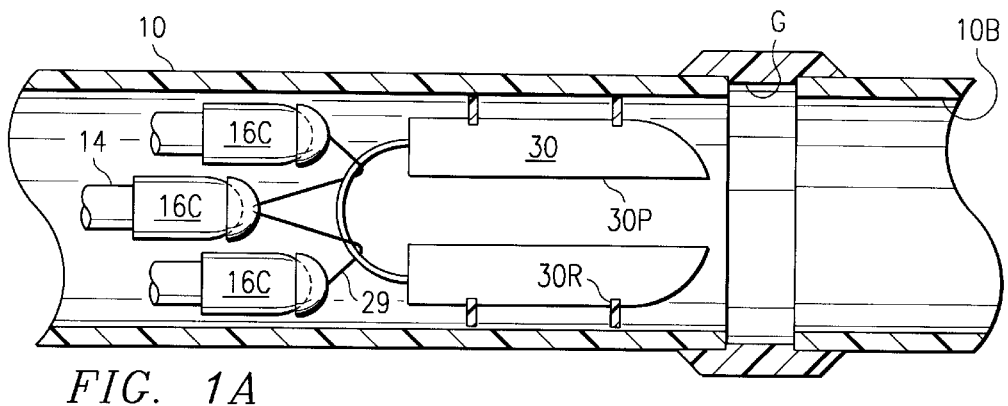
FIG. 1A is simplified side elevation view of a semi-open shuttle to which the feed-in ends of loose guide tubes are coupled by a tether line.

FIG. 1 shows an existing protective duct 10, in which it is desired to install a bundle 12 of guide tubes 14, which are intended to channelize the protective duct, with each guide tube functioning as a separate cable duct. The ends of the guide tubes 14 are closed by a seal check valve 16V, as shown in FIG. 1 or by a seal cap 16C, as shown in FIG. 1A, at the forward, feed-in end thereof. A set of pressure rollers 18 driven by a motor (not shown) pull the guide tube bundle 12 through a feed-in opening 20 of a pressurization chamber 22. Alternatively, a set of caterpillar tractors may be used to pull the guide tubes into the pressure chamber and push the bundle through the protective duct. The pressure chamber also includes an inlet opening 24 for admitting a fluid under pressure, for instance compressed air. The pressure rollers 18 or caterpillar tractors may also be placed outside, immediately in front of, the pressurization chamber 22. Connected in air flow communication with the inlet opening 24 is a compressor 26. The trailing end of each guide tube that is yet to be laid is unwound from a reel 28.

It should be understood that the preferred embodiment of the invention is a loose bundle of guide tubes with loose uncoupled feed-in ends, as shown in FIG. 1 (unlike U.S. Pat.

Figure 1B:
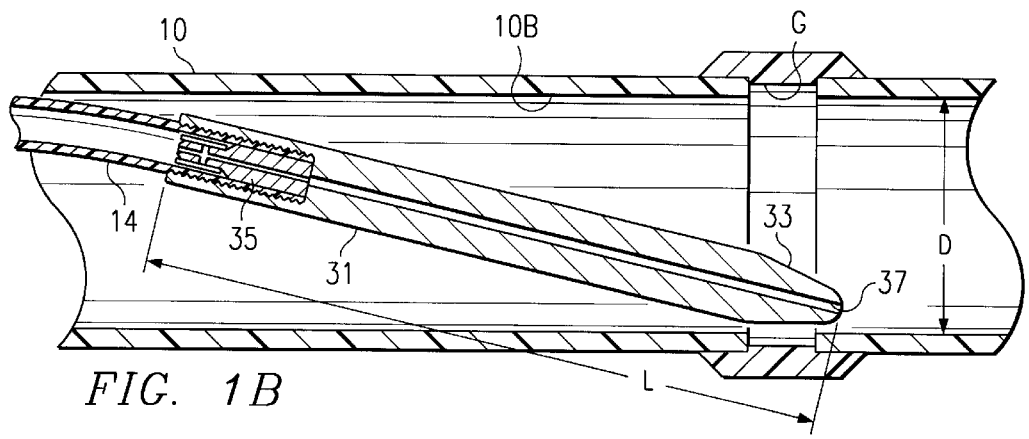
FIG. 1B is a simplified side elevation view of a semi-open, elongated guide probe connected to the feed-in end of a guide tube.

No. 5,884,384, Griffioen). These feed-in ends preferably are closed by a seal, e.g. a check valve 16V for internal pressurization or an end cap 16C. Other embodiments include:

a shuttle 30, preferably semi-open, coupled to each feed-in end, as shown in FIG. 1A, and an elongated probe 31 attached to the feed-in ends with tapering angle in relation with diameter and length of the feed-in end, such as to bridge gaps G in the duct wall, explained by the drawing of FIG. 1B.

According to the shuttle embodiment shown in FIG. 1A, the closed feed-in ends of the guide tubes are connected by a tether line 29 to a guide shuttle 30 so as to resist tensile strain and, if necessary, torsion. The inlet end of the protective duct 10 is coupled in-line with the pressure rollers and in fluid communication with the pressurization chamber outlet port 32. Preferably, the annulus between the guide shuttle 30 and the internal sidewall bore 10B of the protective duct 10 is engaged by one or more flexible leather gaskets 30R, thus assisting the shuttle to glide in axially centered relation along the duct, while constraining the flow of propelling air through an open flow passage 30P which is formed longitudinally through the body of the shuttle.

Alternatively, in the shuttle embodiment of FIG. 1A, the inner wall of the protective duct 10 may be provided with one or more grooves as described in U.S. Pat. No. 5,884,384. On the circumference of the shuttle 30 there are in that case provided one or more guide ribs in the leather gaskets, which engage in the grooves and ensure that the shuttle cannot twist in the protective duct, thereby preventing torsion of the guide tube bundle 12, which is highly undesirable because it renders more difficult the subsequent feed-in of cables into the individual guide tube. Preferably, the bundles of guide tubes 14 are installed loosely inside the protective duct 10 by pushing and blowing.

Figure 4:
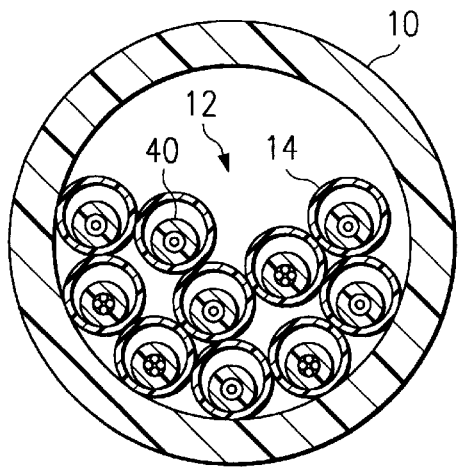
FIG. 4 is a sectional view showing the guide tubes of FIG. 2 in which fiber optic cables have been laid.
Figure 5:
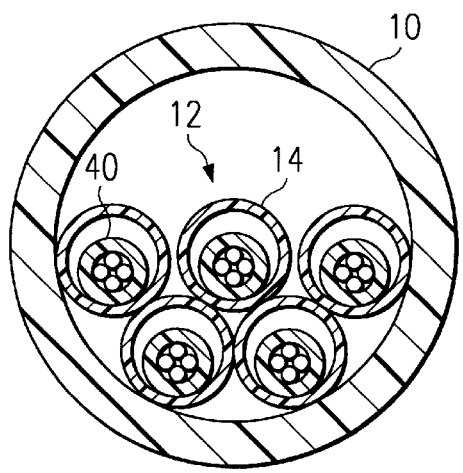
FIG. 5 is a sectional view showing the guide tubes of FIG. 3 in which fiber optic cables have been laid.
Figure 6:
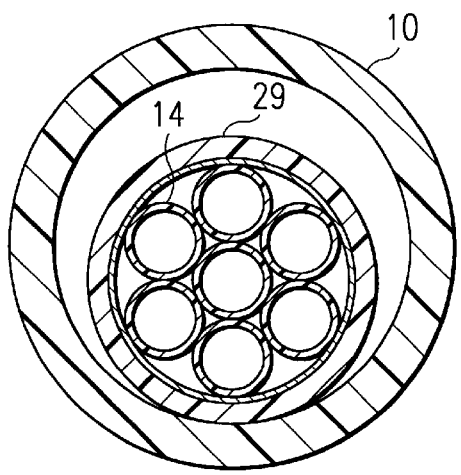
FIG. 6 is a sectional view showing a tightly bound bundle of guide tubes of a first small diameter laid in a large protective duct providing a bundle fill factor of about 50%.
Figure 7:
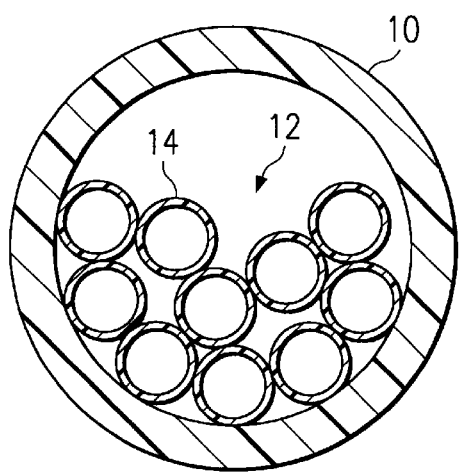
FIG. 7 is a sectional view similar to FIG. 6 showing a loose bundle of guide tubes of the same diameter as shown in FIG. 6, laid in a large protective duct of the same diameter, also providing a bundle fill factor of about 50%.

The protective duct 10 offers the required mechanical protection when sufficient free space is left inside, for example in the loose bundles as shown in FIG. 2, FIG. 3, FIG. 4, FIG. 5 and FIG. 7. In FIG. 6 a tight bundle 29 with 7 tubes of 7/5.5 mm (outside diameter/inside diameter) tightly bound within a tubular sheath and a loose bundle (10 tubes of 7/5.5 mm) are laid in a 40/32 mm protective channelization duct 10 of the same size. The cross-sectional area (calculated by using the outside diameter) of all guide tubes, including the bundle jacket, preferably fills or occupies no more than about half the air flow space inside the protective duct. The bundles with 48% and 49% filling only just satisfy the internal impact requirement. The duct sidewall indentations K shown in FIG. 8 and FIG. 9 result from an impact well below minimum safety requirement. Here it should be noted that the tight bundle 29 already starts to damage, but the guide tubes of the loose bundle 12 are not yet compressed.

Figure 8:
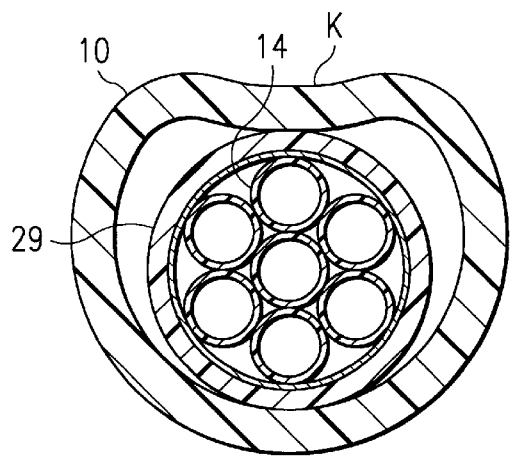
FIG. 8 is a sectional view similar to FIG. 6 showing an indentation of the protective duct in response to a lateral impact, in which a tight guide tube bundle of conventional construction is beginning to undergo compression.
Figure 8A:
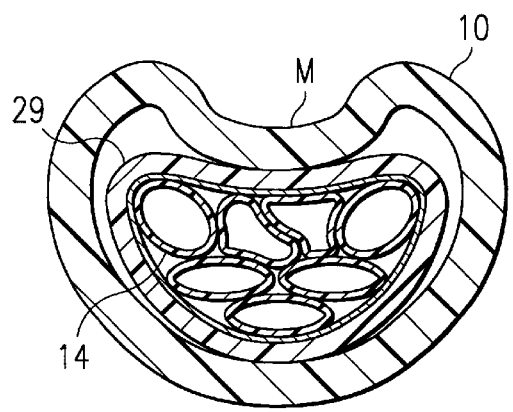
FIG. 8A is a sectional view similar to FIG. 8 showing a deeper indentation of the protective duct in response to a more severe lateral impact that exceeds the minimum safety requirement, which causes the tight bundle to be indented so severely that the guide tubes are damaged.

FIG. 8A shows a sectional view of the protective duct and tight bundle 29 combination of FIG. 8 which has been damaged by a much deeper sidewall indentation M caused by a more severe lateral impact that exceeds the minimum safety requirement. In this tightly bundled example, which satisfies the desired filling degree (about 50%), the guide tubes 14 are nevertheless pinched and crushed, thus causing permanent damage to fiber cables contained therein.

Figure 9:
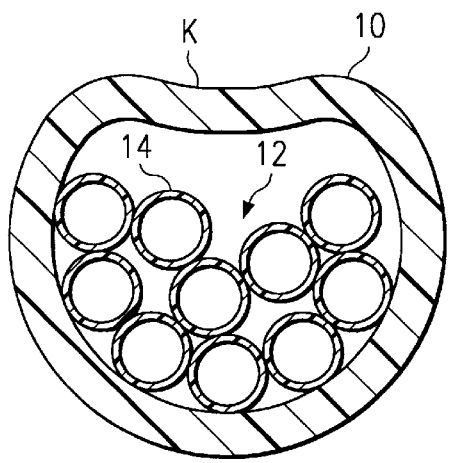
FIG. 9 is a sectional view of the protective duct containing the loose bundle of guide tubes shown in FIG. 7, which has been indented by a lateral impact, with some free space still remaining so that the guide tubes are not being compressed.
Figure 9A:
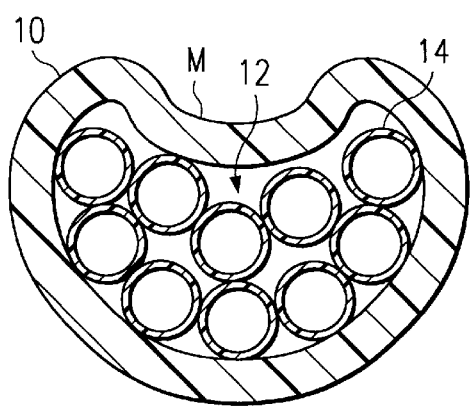
FIG. 9A is a sectional view similar to FIG. 9 showing an indentation of the protective duct in response to a more severe lateral impact that exceeds the minimum safety requirement for tight bundles, but does not cause damage to the guide tubes of the loose bundle since there is still some free space remaining for the loose guide tubes to move away.

In a loose bundle 12 arrangement as shown in FIG. 9A, in which the loose bundle satisfies the desired filling degree requirement (about 50%), the protective duct 10 has sustained a comparable sidewall indentation M in response to a more severe lateral impact that exceeds the minimum safety requirement. However, in this loose bundle example, the guide tubes 14 are not damaged since there is still some free space remaining for the loose guide tubes to move away.

This partial filling also makes possible the blowing of the bundle of guide tubes and allows easy access to each guide tube for branching. The protective ducts can be installed in channelization ducts or may also be laid direct buried into the ground.

According to a first alternative embodiment of the invention, the forward ends of the guide tubes to be installed are connected to an open guide shuttle 30, as shown in FIG. 1A. This open arrangement allows the pressurized fluid to pass and has solely a guiding function. However, the shuttle can also be semi-permeable as described in U.S. Pat. No. 5,884,384 so that the fluid under pressure exerts a force on the shuttle, which thereby pulls the bundle as the shuttle advances in the existing duct.

To avoid the guide tubes from being stuck in obstacles in the protective duct 10, a long front-end guide 31 is provided. An example of a front-end guide is given in FIG. 1B for one of the tubes of a bundle of 10 tubes of 10 mm in a protective duct of 50 mm inside diameter.

According to this arrangement, the feed-in end of the guide tube 14 is connected to an elongated, tubular front-end guide 31 that includes a tapered probe or nose portion 33 that is sized appropriately so that it can bridge across gaps G in the protective duct sidewall. In this embodiment the front-end guide 31 includes an internal flow restrictor 35 and a vent port 37. A plug (not illustrated) may be substituted for the flow restrictor when maintenance of internal pressurization of the guide tube 14 is desired.

The length of the front-end guide should be as follows:

Minimum length L such that maximum tilting in the duct is less degrees than the tapering of the nose portion 33. Note that the less degrees the tapering is, the larger the gap G between the different ducts can be. In FIG. 1B the length L of the front-end guide 31 is 12 cm and the tapering of the nose portion 33 is 20 degrees. A longitudinal gap G of 8 mm between the cut duct end portions then can be passed without problems.

Maximum length L such that the front-end guide 31 can pass bends in the duct trajectory. This condition is fulfilled amply. Note that non-bendable plugs of 15 cm length and a diameter of 85% of the internal duct are usually sent through the duct for calibration. This means that it is possible to produce much longer front-end guides 31 with less tapering (passing wider gaps). Generally, the front-end guide 31 has a length L ranging from twice the internal diameter D of the existing duct, from 10 cm up to 15 cm.

Increasing the diameter of the front-end guide 31 is another way to bridge wider gaps. The maximum diameter is, however, restricted in order to maintain enough space for the bundle of tubes. Note that it is not necessary to place the front-end guides all at the same location. They can be spaced apart, e.g. with one meter between each other (to be preferred).

According to a second exemplary embodiment of the invention, the guide tubes 14 to be installed are pressurized and sealed on both ends to avoid collapsing the guide tubes as the protective duct 10 is pressurized. The fluid flowing along the external walls of the sealed guide tubes to be installed, for open as well as semi-permeable shuttles, has a higher velocity than the traveling speed of the guide tubes, so that a propelling drag force is exerted on the external walls. The method according to the pressurized guide tube embodiment can be carried out with or without a shuttle.

According to conventional practice, first it is tried to install as many guide tubes as possible, simply because even more cables can be installed later and because of the low costs of the guide tubes (a small number is in most cases easier to install, although an extremely small number might cause buckling because of the excessive free space). Exceeding 60% filling degree can cause problems because of above-mentioned reasons and because of the tendency of guide tubes to "lock themselves" and cause tangles when the filling degree is too high.

In the preferred installation method of the present invention, the maximum installation length is almost always achieved and the advantage exists that the existing protective duct need not be provided with openings at pre-calculated points during installation or afterwards, which is highly cost-effective. In order to avoid the counter-pressure arising at the feed-in end of the existing protective duct when introducing the bundle of guide tubes to be installed, it is preferred that adjacent this feed-in end, means are arranged, for instance motor-driven pressure rollers 18, which are adapted, through engagement about the circumference of bundle of tubes to be installed, to lead the tubes into the existing protective duct, thereby providing supplemental pushing during installation.

The function of the protective duct 10 is to guide and protect the guide tubes 14 and their optical cables. In order to allow installation of a bundle 12 of guide tubes by blowing, the protective duct should resist the required pressure differences. The protective ducts may be direct buried into the ground and are of commonly used type, e.g. high density polyethylene (HDPE) ducts. They should be circular and uniform in cross-section throughout their length. Their outer and inner surfaces should be free from irregularities such as cracks, pinholes, joints, water splash marks, die-marks, repairs and all other defects.

The inner-side contains preferably (but not obligatory) longitudinal ribs to reduce the friction-coefficient between the bundle of guide tubes and the protective duct. Also a low-friction layer, of a solid type, may be applied at the inner side of the protective duct. Before installation of the bundle of guide tubes, a lubrication material may be applied to further reduce friction. The preferred outer diameters of the protective ducts are 25, 32, 40, 50 and 63 mm (metric), or US equivalents.

The protective ducts are installed as straight as possible (although pulling the ducts during closing the trench is not obligatory). Uncoiling is performed by rotating the reel, not by picking turns from a horizontally laid coil (which will form helixes). Bends in the trajectory have a minimum bending radius of 1 m, although some bends with smaller bending radius (e.g. 0.5 m) might be present close to terminations of the branch (a 25 mm duct is used for this). Smaller bending radius will decrease blowing performance of tubes and cables. Also excessive numbers of bends will decrease blowing performance.

The function of the guide tubes 14 is to form dedicated channels to guide optical cables through the access network without splicing the cables. In order to allow installation of both the optical cables and the bundle of guide tubes by blowing, the guide tubes should resist the needed pressure, both internal and external (to avoid implosion the guide tubes are also pressurized during installation of the bundle). The guide tubes preferably are formed of high density polyethylene (HDPE) Other material, e.g. nylon or ABS, is also possible. The guide tubes are preferably circular and uniform in cross-section throughout their length. Their outer and inner surfaces should be free from irregularities such as cracks, pinholes, joints, water splash marks, die-marks, repairs and all other defects.

The outside of the guide tubes 14 should be free from lubricant or other contamination. The diameters of the guide tubes used in the loose bundle installation are 7/5.5 and 10/8 mm. The requirement for the number of guide tubes is determined as follows: the total cross-sectional area of the outside of the guide tubes 14 should be about half of the cross-sectional air flow area inside the protective duct 10. Preferably, the guide tube bundle fill factor is 50%, that is, the effective cross sectional area occupied by the guide tube bundle 12 should be one-half of the total cross sectional air flow area of the protective duct. Less than optimum values are obtained but relatively trouble-free installation is nevertheless realized when the guide tube bundle fill factor is less than 50% but not less than about 30%, and more than 50% but not exceeding about 60%.

For pushing and blowing of the bundle of guide tubes a blowing compressor unit 26 is used in combination with specially designed caterpillar rollers 18 in which the bundle of guide tubes is accurately stacked and clamped. The guide tubes are also guided through one or more molds 34, before and/or after the caterpillar rollers 18, in which the guide tubes are held in the desired array positioning, preferably in a symmetrical pattern. The different reels 28 of guide tubes are placed on a specially designed frame and are driven by multiple unwind-units (passive or active, i.e. mechanically driven) Before blowing the bundle of guide tubes, the protective duct 10 may be lubricated with a special lubricating material.

The guide tubes are first pressurized preferably at a pressure at least equal to the pressure used to blow in the bundle. This precaution is to avoid implosion collapse of the guide tubes. The guide tubes are pressurized through air check valves 16. To avoid ingress of lubrication, the bundle of guide tubes is forwarded inside the protective duct 10 only after the guide tubes are fully pressurized (a few minutes after coupling of the compressor 26). The pressurization is checked with a manometer at the reel end of each guide tube. After installation the guide tubes are closed off using watertight seals.

Figure 2:
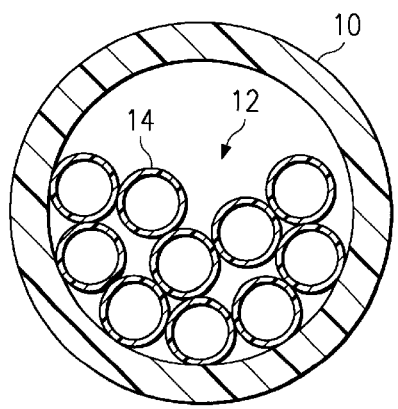
FIG. 2 is a sectional view showing a loose bundle of guide tubes of a first small diameter laid in a large protective duct providing a bundle fill factor of 48%.
Figure 3:
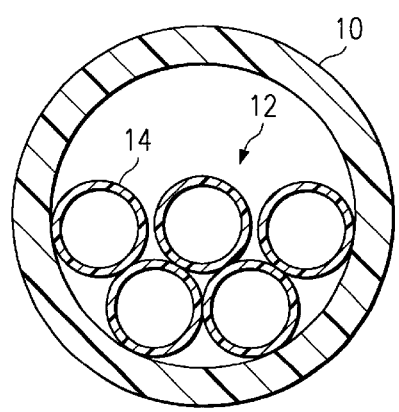
FIG. 3 is a view similar to FIG. 2 showing a loose bundle of guide tubes of a second small diameter providing a bundle fill factor of 49%.

In FIG. 2 and FIG. 3, examples are shown of 40/32 mm protective ducts 10 with, respectively, ten guide tubes 14 of 7/5.5 mm and five guide tubes of 10/8 mm. These combinations each fulfill the requirement of half filling (cross-sectional area) of the protective duct. In FIG. 4 and FIG. 5, fiber optical cables 40 are laid in the guide tubes 14.

For 32/26 mm ducts, respectively, 7 guide tubes of 7/5.5 mm and 3 guide tubes of 10/8 mm can be laid. For 50/40 mm ducts, respectively, 14 guide tubes of 7/5.5 mm and 7 guide tubes of 10/8 mm can be laid. For 63/50 mm ducts, respectively, 20 guide tubes of 7/5.5 mm and 10 guide tubes of 10/8 mm can be used. The 25/19 mm branch-duct shown in FIG. 11 offers space for 1 guide tube of 10/8 mm or 2 guide tubes of 7/5.5 mm. It is possible to connect two guide tubes at the same time in a branch connector.

Field tests were performed in 40/32 mm protective ducts with loose bundles 12 of four guide tubes 14 of 10/8 mm (filling degree 39%), five guide tubes of 10/8 mm (filling degree 49%), seven guide tubes of 7/5.5 mm (filling degree 33%) and ten guide tubes of 7/5.5 mm (filling degree 48%). In a standard duct trajectory (a bend with radius of 1.2 m every 200 m) the bundles with 33% and 39% filling degree could be blown in over 1500 m. The bundles with 48% and 49% filling could be blown in over 1200 m. Here the installation length starts to diminish, but still practical lengths can be achieved.

Bundles with higher filling degree were not tried because a further drop in installation length was expected. Moreover the bundles with 48% and 49% filling only just fulfilled the internal impact requirement. The indentation shown in FIG. 8 is for an impact well below the one specified as minimum requirements; note that here already the tight bundle 29 starts to damage, while the loose bundle in FIG. 9 is not affected by the same indentation.

Theoretical calculations do not predict a big decrease in blowable length for loose bundles. The decrease in blowable length for bundles with higher filling degree (more than about 60% filling) in practical trials is most probably attributed to crossing of the tubes and formation of tangles. When the filling degree of the bundle is low there is space enough for crossing of guide tubes. When pushing, buckling of the guide tubes results in extra friction due to buckling. Here a longitudinal pushing force results in a transversal force between the guide tube and protective duct. However, when the cause of hindering the bundle is taken away the buckles disappear, at least partly. Anyway the friction caused by the buckling will disappear completely.

When the bundle fills the duct more, crossing of the guide tubes may cause those tubes to be pressed against the duct wall. A permanent "tangle" may be formed, locking the bundle inside the protective duct with high friction. Because the propelling forces are low with pushing/blowing these "tangles" can have a large effect on installation performance. Also buckling can cause permanent friction now. This is caused by a 3-dimensional restriction in the duct. For filling degrees higher than 50% a buckle may bend in the plane perpendicular to the buckling plane and form a permanent "spring". This "spring" remains when the pushing forces are taken away.

Branches, joints and terminations are needed to make a network of the tubes and cables. For this a number of components are required. A cable can branch off from a bundle without making a splice. Branching can be done at any place and any time by simply cutting the protective duct 10 and the guide tube 14 of choice, for example as shown in FIG. 11. Before installing the cable, the exposed section of the selected guide tube 14 is cut at 14C and the free end is then connected to a branch guide tube 14A by using a permanent or push/pull guide tube coupling 36.

Figure 13:
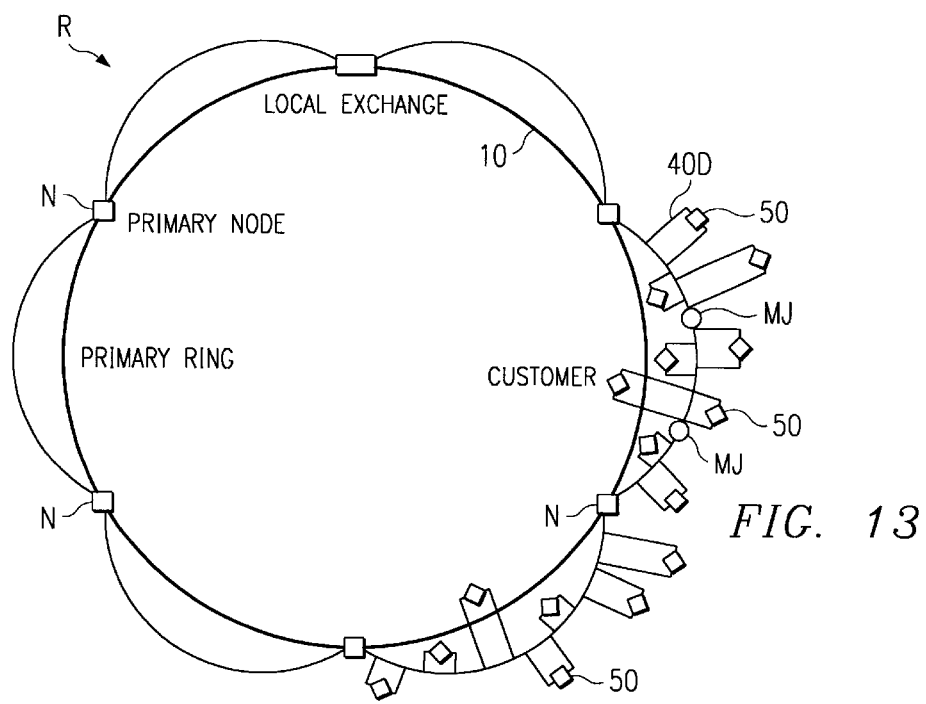
FIG. 13 is a simplified diagram of a primary ring fiber optic access network for business customers with redundant 2-fiber drop cable connections.
Figure 14:
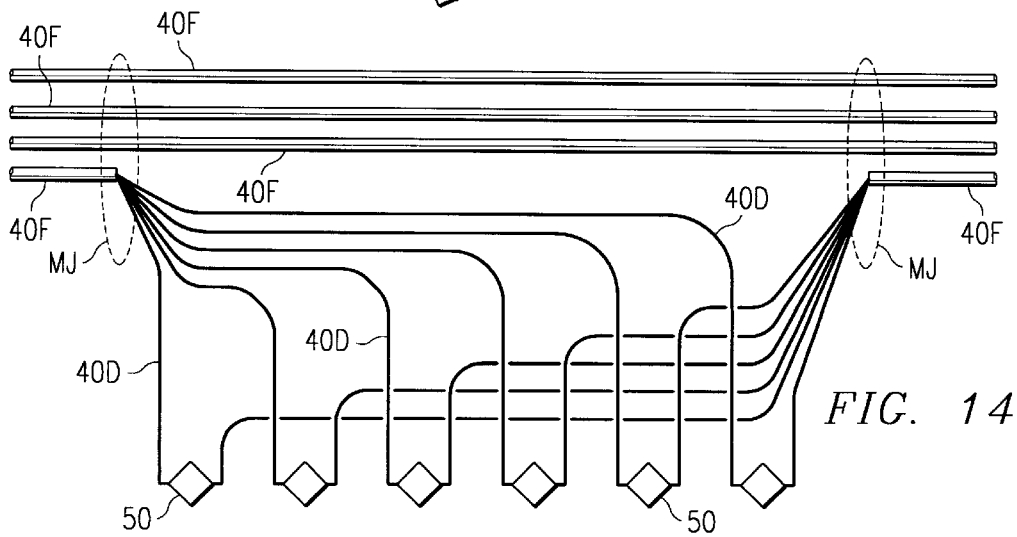
FIG. 14 is a simplified routing diagram showing multiple protective distribution ducts and redundant fiber optic cables laid in drop tubes running to business customers from multiple branching points.

The branch guide tube 14A is installed in a protective branch duct 10A which leads to a customer interface station 50 (FIGS. 13 and 14). The main protective duct 10 at the branch point is restored and connected to the branch protective duct, preferably by using a clip-on branch connector 38. The branch connector 38 includes a tubular branch coupling stub 38S. The protective branch duct 10A is joined in a mud-tight union with the coupling stub 38S so that a continuous, dedicated channel is established.

For straight coupling of the protective ducts a connection can be made by using simple straight "screwable" couplings, for example the threaded coupling rings 38A and 38B shown in FIG. 11. Also joints with fiber-splices or even fiber-splitters may occur in the network. This can be done using hand-holes with splice-closures. Tubes and cables entering hand-holes are sealed using special gas-tight and water-tight seals. In this way dedicated channels are formed by the guide tubes 14, 14A in which small, but outside-plant resistant, optical cables 40 are pushed or blown in through the branch connection to the customer without splicing.

The function of the guide tube coupling 36 is to elongate or restore a channel route and to allow branching installation of a drop cable. The mounted guide tube connector should have a smooth inside geometry to allow passing of the cable without sticking and should be airtight and pressure resistant to allow installation by blowing. The guide tube coupling 36 can be permanent or a push/pull, press-fit type.

The function of the protective duct couplings 38A and 38B is to elongate or restore the protective duct 10 and to allow installation of a bundle of guide tubes. The mounted protective duct coupling should have a smooth inside geometry to allow passing of the bundle of guide tubes without sticking and should be airtight and pressure resistant to allow installation by blowing. The protective branch coupling 38 is threaded on its opposite ends for engaging the coupling rings 38A and 38B, preferably in a water-tight, but at least mud-tight union. Note that the protective duct-ends in the coupling must be properly cut, at right angles, to ensure that sticking of the guide tubes is not possible.

The function of the branch connector 38 is to restore the protective duct after a branch has been made and offering sufficient mechanical protection. The branching (coupled) guide tube 14A follows a smooth path with sufficiently large bending radius inside the branch connector in order to allow passing of the cable without problems. The unused part of the cut guide tube is closed with a plug. No further installation of guide tubes is needed at the branch connectors. Therefore branch connectors do not need to be smooth-walled and pressure resistant. They should, however, be at least mud-tight.

The optical cables are the critical elements in the optical access network. Their function is to transport the information through the network. This must be done over the operating lifetime of at least 20 years without any degradation. Since the cable may face real outside plant conditions during handling and service they should be fully resistant to those conditions, e.g. they must withstand polluted water, oil and other harsh environment. In conventional cable construction, the fibers are enclosed within a thick polymer jacket, which provides some protection but limits the number of cables and fiber density in each guide tube, thus imposing a limit on the fiber density of the cables in the feeding duct and branch duct.

Figure 12:
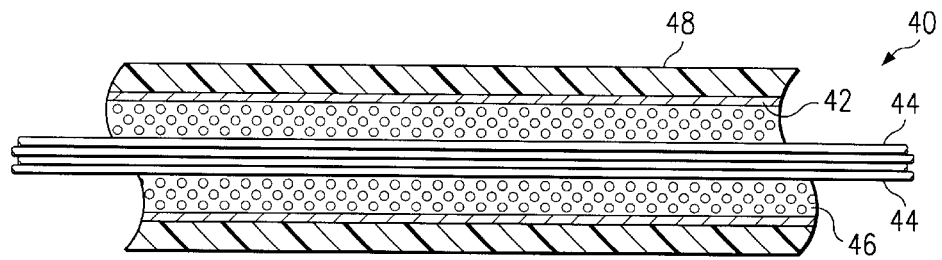
FIG. 12 is a longitudinal sectional view showing the preferred construction of the fiber optic cable that is adapted for installation in the guide tubes shown in FIG. 4 and FIG. 5.

According to one aspect of the present invention, the fiber density limitation is overcome and installation length is improved by enclosing the fibers in a very small diameter metal tube. Referring to FIG. 10 and FIG. 12, the preferred fiber optic cable 40 of the present invention has a metal water-barrier jacket which consists of a small diameter, thin sidewall laser-welded steel tube 42. This metal tube is loosely filled with optical fibers 44 and a gel waterproofing material 46, for example silicone gel or aquagel. The function of the gel is to provide longitudinal water-tightness. When the metal barrier is leaking (transversal) somewhere, the gel 46 ensures that not a long length of cable is immediately flooded with water. Instead of gel also water-absorbent powder or tape may be used, which swells and forms an internal annular seal barrier which isolates the leaking zone. The fibers 44 are free to "float" within the steel tube, and thus are decoupled from external mechanical forces and stresses which act on the cable during installation.

A protective tubular jacket 48 of foamed high density polyethylene (HDPE) surrounds the small diameter steel tube 42. The welded steel tube 42 and protective polymer jacket prevent water or other unwanted matter to penetrate into the cable. The steel-tube construction also offers sufficient mechanical protection against damage that could be caused by pushing, pulling, bending, crushing and all other handling. Because the water-barrier is fully hermetic the compatibility of all materials inside the barrier, especially the water and hydrogen content (hydrogen can cause optical attenuation), is of special importance.

The steel tube 42 has a high strength and a low thermal contraction coefficient, when compared to e.g. plastics.

Because of this no additional strength members are needed (saves space). Also no large "play" of fiber length is needed in the cable because length differences between fiber and cable hardly vary with temperature. To get "play" of fibers, or fiber excess length, the fibers are installed in a helical (or otherwise undulating) way inside tubes in the cable. The more excess length needed, the larger the diameter of the tube needs to be (boundary conditions: the helical or undulating shape should not bend the fiber too much).

Because of the small "play" needed inside the steel tube this tube and its polymer jacket can be made with a very small diameters. The steel tube construction permits very high fiber counts to be obtained in cables with small diameters. Preferred outside diameter/inside diameters for the steel tube 42 and outside diameter for the polymer jacket 48 are as follows: containing 4 fibers: steel tube—1.42/1.12 mm, polymer jacket—3.9 mm; 12 fibers: steel tube—2.0/1.8 mm, polymer jacket—3.9 mm, 48 fibers: steel tube—3.5/3.2 mm, polymer jacket—5.0 mm; 60 fibers: steel tube—3.9/3.6 mm, polymer jacket—5.0 mm.

Another advantage of the steel tube is its relatively larger stiffness for its small size. Conventional cables having small diameters (e.g., in the range from 3.9 to 5.5 mm) and traditional polymer jacket construction would have much lower stiffness compared to larger cables (e.g., in the range from 10 to 25 mm) of traditional construction. Cables with low stiffness can be installed by pure blowing, but installation by pushing of low stiffness cables is difficult, and installation length is limited. Cables with higher stiffness can be installed by a synergy of pushing and blowing according to U.S. Pat. Nos. 4,850,569 and 4,934,662 (Griffioen). When cables containing small diameter metal tubes and/or loose-bundle guide tubes are installed according to the present invention, with pushing and blowing, about twice the installation length is reached as with pure blowing. Also, the number of cables and fiber density in each guide tube can increased, thus increasing the fiber capacity of the feeding ducts and branch ducts.

Traditional cables have a stiffness which is around the optimal value for synergetic pushing and blowing, see FIG. 5. in W. Griffioen, "Installation of optical cables in ducts", Plumettaz, Bex (CH) 1993. Small cables of conventional construction would be on the lower side of this optimal stiffness. The stiffness is proportional to the diameter to the power of 4, i.e. the stiffness of cables of small diameter and conventional construction will be a four-fold factor lower than for traditional cables. However, with the small diameter steel tube construction the stiffness is, however, considerably higher and, again, optimal synergy of pushing and blowing is obtained, making possible substantially longer installation lengths.

For pushing and blowing of the cables 40 into the dedicated channel formed by the guide tubes 14 and the branch guide tubes 14A, powered drive wheels are used in cooperation with pressurized air flow provided by a compressor and drive rollers or caterpillar tractors similar to the bundle installation equipment shown in FIG. 1. The drive equipment and the compressor are smaller, since only one cable is blown in at a time. The side-pressure of the drive wheels 18 should be adjusted in accordance with cable properties for minimal slip. No pre-lubrication is needed when the guide tubes already have a pre-lubricated inside layer. At the forward end of each cable a small and smooth brass or steel cap is mounted, e.g. screwed, to avoid sticking of the cable in the guide tube. Optionally, to improve installation performance, a roller-set is used to straighten the cable.

The methods of the present invention can be used to construct a large ring network R, as is shown in FIG. 13. The access part of the network from FIG. 14 can be seen here as the secondary clamp-shells, which are connected (spliced) to the primary ring R at the primary nodes N. This primary ring R can consist of a single 40 mm protective duct 10 with a loose bundle of five guide tubes 14 (as shown in FIG. 5), each containing a 48-fiber cable 40 to feed one of the primary nodes N. A simple access network example is shown in FIG. 14. Here four feeding 12-fiber cables 40F are spliced at multi-joint splice points MJ to six 2-fiber cables 40D that make the drop to the customer 50, everything redundantly connected. The drop cables 40D are guided from the splice points MJ through customer branching connectors 38 to the customer interface access stations 50, thus allowing one-shot blowing installation of cable to the customers. The whole feeding and drop fits into a single 40 mm protective duct 10. With this configuration it is possible to connect thirty customer access stations 50 in a redundant way. It is also possible to reserve some extra capacity at the branch points.

For the sake of completeness, it is further noted that the method of the invention is suitable not only for installing a bundle of tubes without contents but also for installing tubes in which an elongate element is present, such as another tube, or a telecommunication cable, such as a copper cable or an optical fiber cable, or a power cable or the like, which has been laid beforehand. More importantly, it is now possible to blow in a bundle of guide tubes in a protective duct in which a previously installed cable is already present.

What is claimed is:

1. A method for installing a bundle of tubes into an existing duct, comprising:

introducing a fluid under pressure into the existing duct at an inlet end thereof;

arranging a number of tubes into a loose bundle, the number and cross sectional area of the tubes being selected to provide a partial filling of the duct in the range of from about 30% to about 60%; and feeding the bundle of tubes into the existing duct through the inlet end thereof.

2. A method according to claim 1, wherein the number of tubes and the cross-sectional areas thereof ate selected to provide partial duct filling of about 50%.

3. A method according to claim 1, wherein the number of tubes and the cross-sectional areas thereof are selected to provide a partial duct filling of less than 50%, but not less than about 30%.

4. A method according to claim 1, wherein the number of tubes and the cross-sectional areas thereof are selected to provide a partial duct filling of more than 50%, but not more than about 60%.

5. A method according to claim 1, including the step:

pressurizing the tubes to be installed and sealing the pressurized tubes at the leading end and at the trailing end thereof.

6. A method according to claim 1, including the step of maintaining the tubes in loose association with each other as they are fed into the existing duct.

7. A method according to claim 1, including the step of positioning the tubes to be installed in a symmetrical loose bundle as they are fed into the existing duct.

8. A method according to claim 7, wherein the positioning step is performed by forcing the loose bundle of tubes through a symmetrical mold as they are being fed into the existing duct.

9. A method according to claim 7, including the step:
engaging the tubes in the symmetrical loose bundle with tractor drive wheels on at least three sides of the bundle.

10. A method according to claim 1, including the steps:
supplying the tubes to be installed from a reel; and
unwinding the reel as the tubes are fed into the existing duct.

11. A method according to claim 1, including the step:
straightening the tubes before they are fed into the existing duct.

12. A method according to claim 1, including the step:
maintaining the existing duct open to the flow of the pressurized fluid into the inlet end thereof and out of the terminal end thereof.

13. A method according to claim 1, including the step:
positioning the leading ends of the tubes away from the inner sidewall of the existing duct as the tubes are advanced through the duct.

14. A method according to claim 13, wherein the positioning step is performed by:
supporting the leading ends of the tubes to be installed on a shuttle.

15. A method according to claim 13, including the step:
positioning the leading ends of the tubes in a symmetrical pattern on a shuttle.

16. A method according to claim 1, including the step:
engaging a circumference of the tubes to be installed adjacent to the inlet end of the existing tube with a set of powered drive rollers so that the tubes are positioned in a symmetrical pattern as they are fed into the existing duct.

17. A method according to claim 1, including the step:
laying one or more cables in one or more of the tubes before installing the tubes in the existing duct.

18. A method according to claim 1, in which one or more cables and/or guide tubes are already installed in the existing duct, and in which the number of tubes to be installed additionally follows from a filling degree in the range between 30% and 60%, in which the cross-sectional area of the previously installed cables and/or tubes is added.

19. A method according to claim 1, including the step:
installing one or more cables, by blowing and/or pushing, in one or more of the tubes after installing the tubes in the existing duct.

20. A method according to claim 1, including the steps:
a. after the tubes have been installed, cutting the existing duct at a branch point and exposing the installed tubes;
b. cutting one of the exposed tubes at the exposed branch point for connection to a branch tube;
c. connecting a branch tube from a branch duct to the end of the cut tube thereby forming a dedicated guide channel;
d. installing a Y-branch connector around the cut ends of the existing duct and around the branch duct; and
e. installing one or more cables, by blowing or pushing, in the dedicated guide channel.

21. A method according to claim 1, including the steps:
providing a cable with a core of one or more optical fibers that are enclosed within a tubular metal jacket; and
installing the cable, by -blowing and/or pushing, in one of the tubes after the tubes have been installed in the existing duct.

22. A method for installing a bundle of tubes in an existing duct, comprising:

introducing a fluid under pressure into the existing duct at an inlet end thereof;

arranging a number of tubes into a loose bundle, the number and cross sectional area of the tubes being selected to provide a partial filling of the duct in the range of from about 30% to about 60%;

maintaining the existing duct open to the flow of the pressurized fluid into the inlet end thereof and out of the terminal end thereof;

connecting a forward end of the tubes to be installed to a shuttle;

introducing the shuttle into the open inlet end of the existing duct; and introducing a fluid under pressure into the existing duct through the open inlet end thereof to cause the tubes and shuttle to move along the existing duct.

23. A method according to claim 22, including the step of opening the shuttle to permit bypass flow of the fluid under pressure.

24. A method according to claim 22, including the step of partially closing the shuttle to restrict flow of the fluid under pressure.

25. A method for laying a bundle of tubes into an existing duct, comprising:

introducing a fluid under pressure into the existing duct at an inlet end thereof;

arranging a number of tubes to be laid into a loose bundle;

attaching a front-end guide to the leading end of each tube to be laid, the front-end guide having a tapered nose portion and a minimum length such that maximum tilting of the front-end guide in the existing duct is less degrees than the tapering of the nose portion; and feeding the bundle of tubes into the existing duct through the inlet end thereof.

26. A method according to claim 25, including the step:
sealing the front-end guide to block the flow of pressurized fluid through the tube.

27. A method according to claim 25, including the step:
limiting the flow of pressurized fluid through the front-end guide with a flow restrictor or valve contained inside the front-end guide.

28. A method according to claim 25, wherein the front-end guide comprises an elongated body portion with a length ranging from twice the internal diameter of the existing duct up to 15 cm.

29. A method according to claim 25, wherein the front-end guide has a nose portion with a tapering between 10 and 25 degrees relative to the elongated body portion.

30. A method according to claim 25, including the step of maintaining some longitudinal spacing between the front-end guides as the guide tubes are installed.

31. A method for installing a bundle of cables in a protective duct, each cable including a core of one or more optical fibers, comprising the steps:

increasing the stiffness of each cable by enclosing its core within a small diameter tubular metal jacket;

arranging a number of the stiffened cables into a loose bundle, the number and cross sectional area of the stiffened cables being selected to provide a partial filling of the protective duct in the range of from about 30% to about 60%; and installing the cables, by blowing and/or pushing, in the protective duct.

32. A method according to claim 31, wherein the number of stiffened cables and the cross-sectional areas thereof are selected to provide a partial filling of about 50%.

33. A method according to claim 31, wherein the number of stiffened cables and the cross-sectional areas thereof are selected to provide a partial filling of less than 50%, but not less than about 30%.

34. A method according to claim 31, wherein the number of stiffened cables and the cross-sectional areas thereof are selected to provide a partial filling of more than 50%, but not more than about 60%.

* * * * *

UNITED STATES PATENT AND TRADEMARK OFFICE
CERTIFICATE OF CORRECTION

PATENT NO. : 6,572,081 B2
DATED : June 3, 2003
INVENTOR(S) : Willem Griffioen et al.

It is certified that error appears in the above-identified patent and that said Letters Patent is hereby corrected as shown below:

Title page,
Item [56], OTHER PUBLICATIONS, "Cooper" should be -- Copper --.
Insert -- [74] *Attorney, Agent or Firm* - Dennis T. Griggs --.

Signed and Sealed this

Ninth Day of September, 2003

JAMES E. ROGAN
*Director of the United States Patent and Trademark Office*